(12) United States Patent
Kato et al.

(10) Patent No.: US 10,697,819 B2
(45) Date of Patent: Jun. 30, 2020

(54) LIQUID LEVEL DETECTING DEVICE WITH ARM FIXING PORTION HAVING HOLDING GROOVE FOR RECEIVING FLOAT ARM

(71) Applicant: Yazaki Corporation, Tokyo (JP)

(72) Inventors: Shinpei Kato, Makinohara (JP); Shintaro Nakajima, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 190 days.

(21) Appl. No.: 15/982,314

(22) Filed: May 17, 2018

(65) Prior Publication Data

US 2018/0348043 A1    Dec. 6, 2018

(30) Foreign Application Priority Data

Jun. 5, 2017 (JP) ................. 2017-111091

(51) Int. Cl.
*G01F 23/38* (2006.01)
*G01D 5/14* (2006.01)

(52) U.S. Cl.
CPC ............. *G01F 23/38* (2013.01); *G01D 5/145* (2013.01)

(58) Field of Classification Search
CPC ....... G01F 23/603; G01F 23/38; G01D 5/145; G01D 11/245; F17C 2250/0413
See application file for complete search history.

(56) References Cited

U.S. PATENT DOCUMENTS

| | | | |
|---|---|---|---|
| 2004/0003660 A1* | 1/2004 | Fukuhara | G01F 23/38 73/319 |
| 2008/0072668 A1* | 3/2008 | Miyagawa | G01F 23/363 73/319 |
| 2008/0231267 A1 | 9/2008 | Miyagawa et al. | |
| 2011/0036165 A1* | 2/2011 | Fukuhara | G01F 23/38 73/317 |
| 2015/0362356 A1* | 12/2015 | Fukuhara | G01F 23/38 73/314 |

FOREIGN PATENT DOCUMENTS

| | | |
|---|---|---|
| CN | 101271013 A | 9/2008 |
| JP | 2010-169560 A | 8/2010 |
| JP | 2012-225897 A | 11/2012 |
| JP | 5176997 B2 | 4/2013 |

* cited by examiner

*Primary Examiner* — Suman K Nath
(74) *Attorney, Agent, or Firm* — Sughrue Mion, PLLC

(57) ABSTRACT

A liquid level detecting device includes a sensor housing, a holder, an arm fixing portion provided in the holder, a float arm, a float, a magnet provided in the holder, and a Hall element. The arm fixing portion includes a lock hole configured to receive a lock end portion of the float arm, a holding portion having a holding groove, and a retaining portion having a claw. The holding portion has a holding piece that extends parallel with a front surface of the holder and thereby forms the holding groove. The holding piece has a holding projection that projects toward the front surface of the holder so that a projection length of the holding projection increases gradually as the holding piece goes away from the lock hole.

7 Claims, 10 Drawing Sheets

LIQUID LEVEL DETECTING DEVICE WITH ARM FIXING PORTION HAVING HOLDING GROOVE FOR RECEIVING FLOAT ARM

CROSS REFERENCE TO RELATED APPLICATIONS

This application is based on Japanese Patent Application (No. 2017-111091) filed on Jun. 5, 2017, the contents of which are incorporated herein by reference.

BACKGROUND OF THE INVENTION

1. Field of the Invention

The present invention relates to a liquid level detecting device.

2. Description of the Related Art

Liquid level detecting devices for detecting a surface level of liquid stored in a tank are equipped with a device main body having a Hall element, a holder in which a magnet is provided so as to be rotatable with respect to the device main body, a float arm whose base portion is attached to the holder, and a float that is attached to a tip portion of the float arm (refer to JP-B-5176997, for example).

In liquid level detecting devices of the above kind, the float arm swings following the surface level of liquid and the holder rotates with respect to the device main body. The Hall element provided in the device main body detects a variation of the magnetic flux generated by the magnet of the holder and a liquid level is detected on the basis of a result of the detection of the magnetic flux variation. In liquid level detecting devices of this type, the float arm is fixed to the holder so as to cross the rotation axis of the holder by pushing the float arm into a lock portion that is an approximately C-shaped projection through its opening.

Incidentally, in liquid level detecting devices having the above configuration, at the time of, for example, assembling, there may occur an event that the float arm comes into contact with a nearby member, as a result of which a load is applied to the float arm in a direction that crosses its swing direction. In that event, the float arm may go out of the opening of the lock portion of the holder and come off the holder. Reinforcing the lock portion to prevent the float arm from coming off it makes it difficult to attach the float arm to the holder and, in addition, causes a cost or size increase due to complication of the structure.

SUMMARY OF THE INVENTION

The present invention has been made in view of the above circumstances, and an object of the invention is therefore to provide a liquid level detecting device in which the float arm can be fixed to the holder easily and reliably without incurring a cost or size increase.

To attain the above object, the invention provides liquid level detecting devices of the following items (1) to (5):

(1) A liquid level detecting device including:
a sensor housing;
a holder which is held rotatably by the sensor housing;
an arm fixing portion provided in the holder;
a float arm which has a base portion fixed to the holder by the arm fixing portion;
a float which is attached to a tip portion of the float arm and varies in position following a surface level of liquid stored in a tank;
a magnet provided in the holder; and
a Hall element which is provided in the sensor housing and detects a displacement of the magnet of the holder,
wherein the arm fixing portion comprises:
a lock hole configured to receive a lock end portion of the float arm, the lock end portion having a bending shape;
a holding portion having a holding groove configured to receive the float arm; and
a retaining portion having a claw configured to lock on a circumferential surface of the float arm that is fitted in the holding groove;
wherein the holding portion has a holding piece that extends parallel with a front surface of the holder and thereby forms the holding groove; and
wherein the holding piece has a holding projection that projects toward the front surface of the holder so that a projection length of the holding projection increases gradually as the holding piece goes away from the lock hole.

(2) The liquid level detecting device according to item (1), wherein the holding projection has a holding surface that is inclined so as to come closer to the front surface of the holder as the holding projection goes toward an opening of the holding groove.

(3) The liquid level detecting device according to item (2), wherein the holding surface is inclined so that a projection length of the holding surface in a direction of a rotation axis of the holder increases as the holding surface goes toward the opening of the holding groove.

(4) The liquid level detecting device according to item (3), wherein the holding projection has a guide surface which is adjacent to the holding surface and which is arranged closer to the opening of the holding groove than the holding surface, and the guide surface is inclined so that a projection length of the guide surface in the direction of the rotation axis of the holder decreases as the guide surface goes toward the opening of the holding groove.

(5) The liquid level detecting device according to any one of items (1) to (4), wherein the lock portion extends from the holder so as to assume a flexible cantilever arm structure.

In the liquid level detecting device having the above configurations, by fitting the float arm into the holding groove of the holding portion by rotating the float arm with the lock end portion (inserted in the lock hole) as a supporting point, the float arm can be fixed being locked on the holding projection of the holding piece of the holding portion and the claw of the lock portion.

The projection length of the holding projection of the holding piece of the holding portion increases gradually as the position goes away from the lock hole. That is, the projection length of the holding projection increases gradually in the direction in which the displacement of the float arm increases when it receives a load in a direction that crosses its swing direction. This prevents the float arm from coming off the holding groove when receiving a load in a direction that crosses its swing direction.

Furthermore, since the projection length of the holding projection increases gradually as the position goes away from the lock hole, it is possible to fit the float arm into the holding groove from the side of the lock hole without the need for doing so forcibly. That is, it is possible to have the float arm held by the holding portion easily with a weak force by rotating the float arm with its lock end portion (inserted in the lock hole) as a supporting point.

In the liquid level detecting device having the above configurations, even if a load acts on the float arm in a direction that crosses its swing direction and the holding piece is thereby deformed, the holding surface is not prone to form such an angle with the front surface of the holder as to allow the float arm to come off through a gap between them. This is an additional measure for preventing the float arm from coming off the holding groove.

In the liquid level detecting device having the above configuration, the lock portion is bent easily when pushed by the float arm that is being fitted into the holding groove. Thus, the float arm can be held by the holding portion by fitting it into the holding groove with a weaker force.

The invention makes it possible to provide a liquid level detecting device in which the float arm can be fixed to the holder easily and reliably without incurring a cost or size increase.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIG. 11A is a bottom view of part of the holder employed in the embodiment which is provided with a holding portion having a holding projection, and FIG. 11B is a bottom view of part of a holder of a referential example that is provided with a holding portion not having a holding projection.

DETAILED DESCRIPTION OF THE EXEMPLARY EMBODIMENTS

Figure 1:
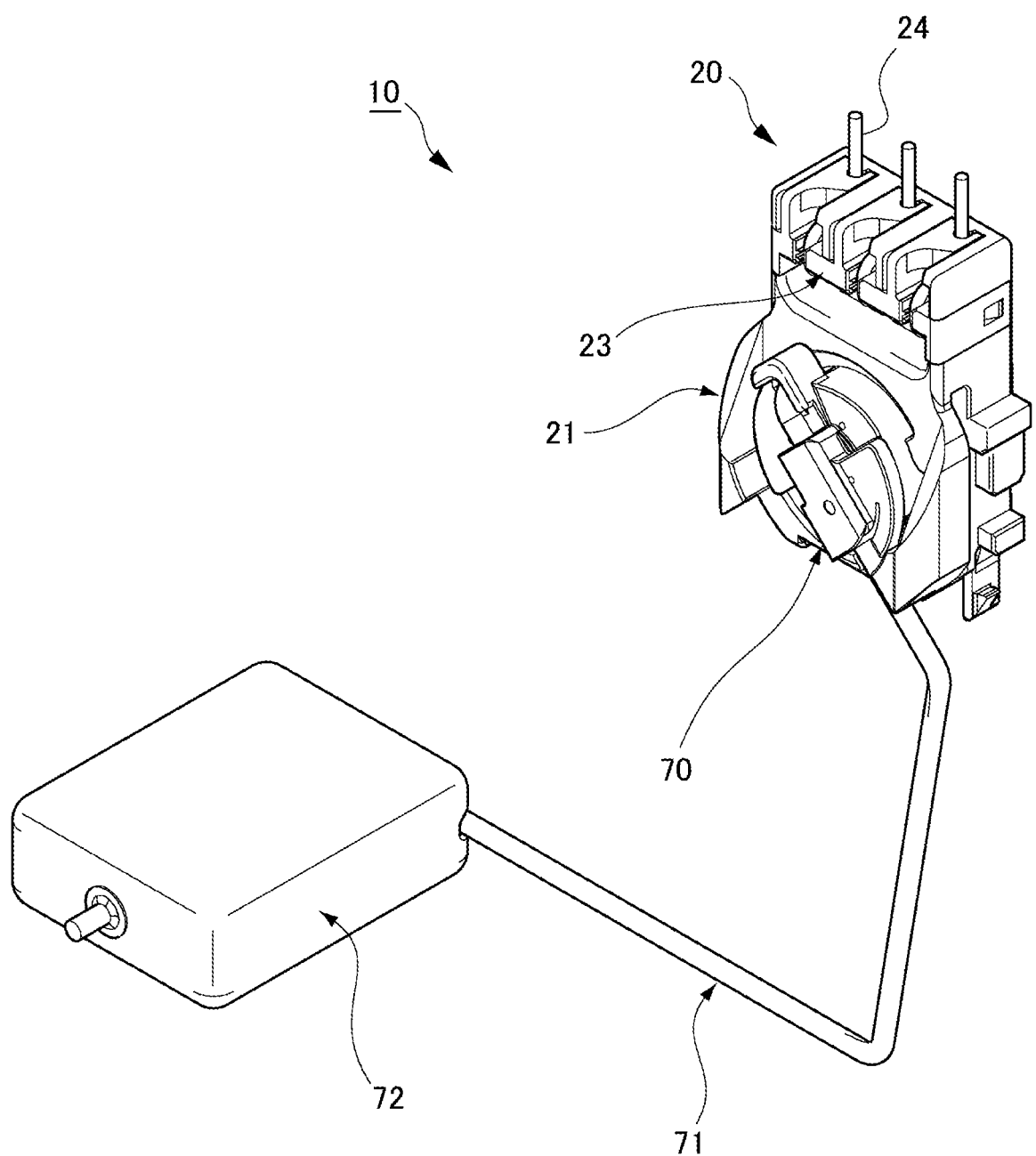
FIG. 1 is a perspective view of the whole of a liquid level detecting device according to an embodiment of the present invention.
Figure 2:
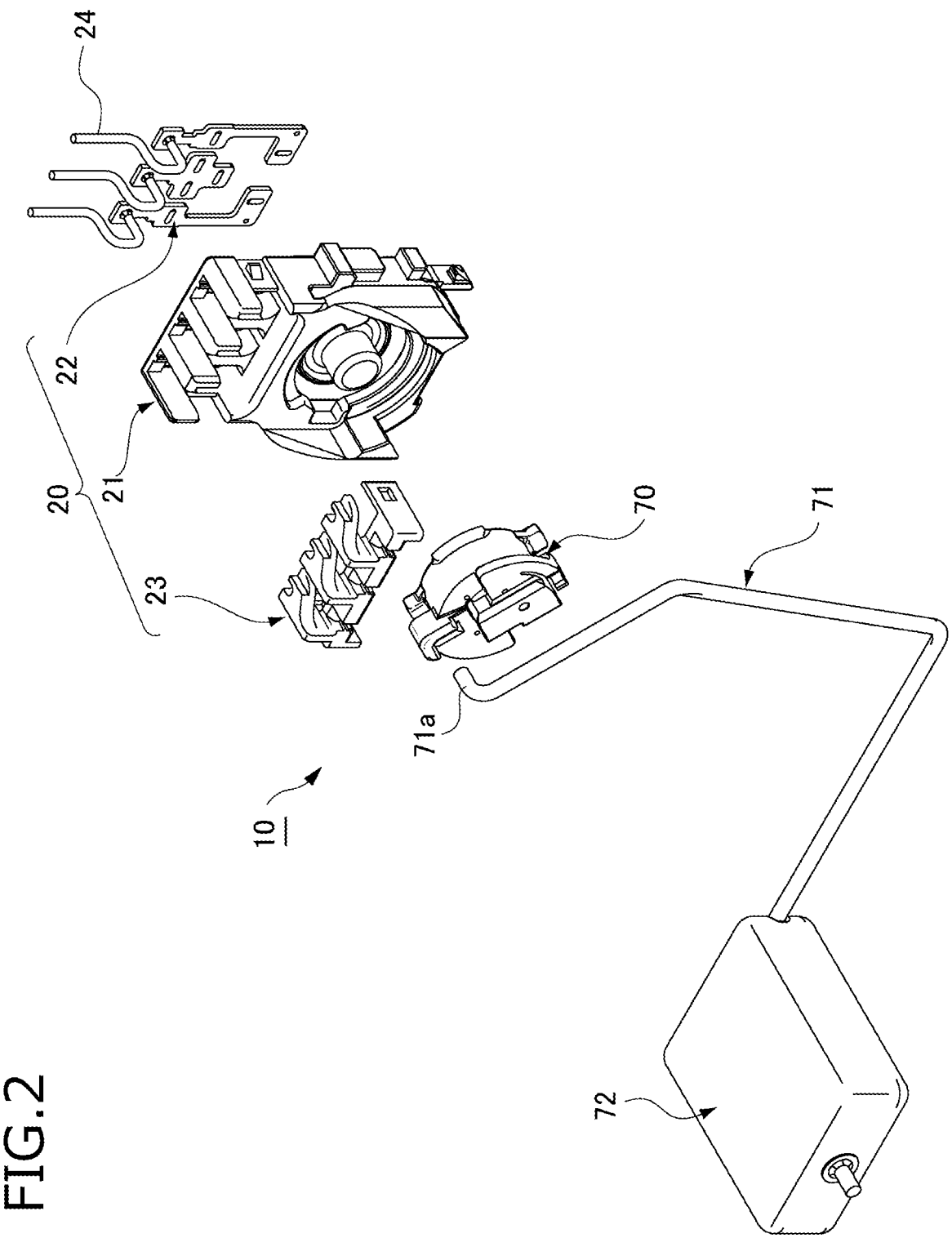
FIG. 2 is an exploded perspective view of the liquid level detecting device according to the embodiment.
Figure 3:
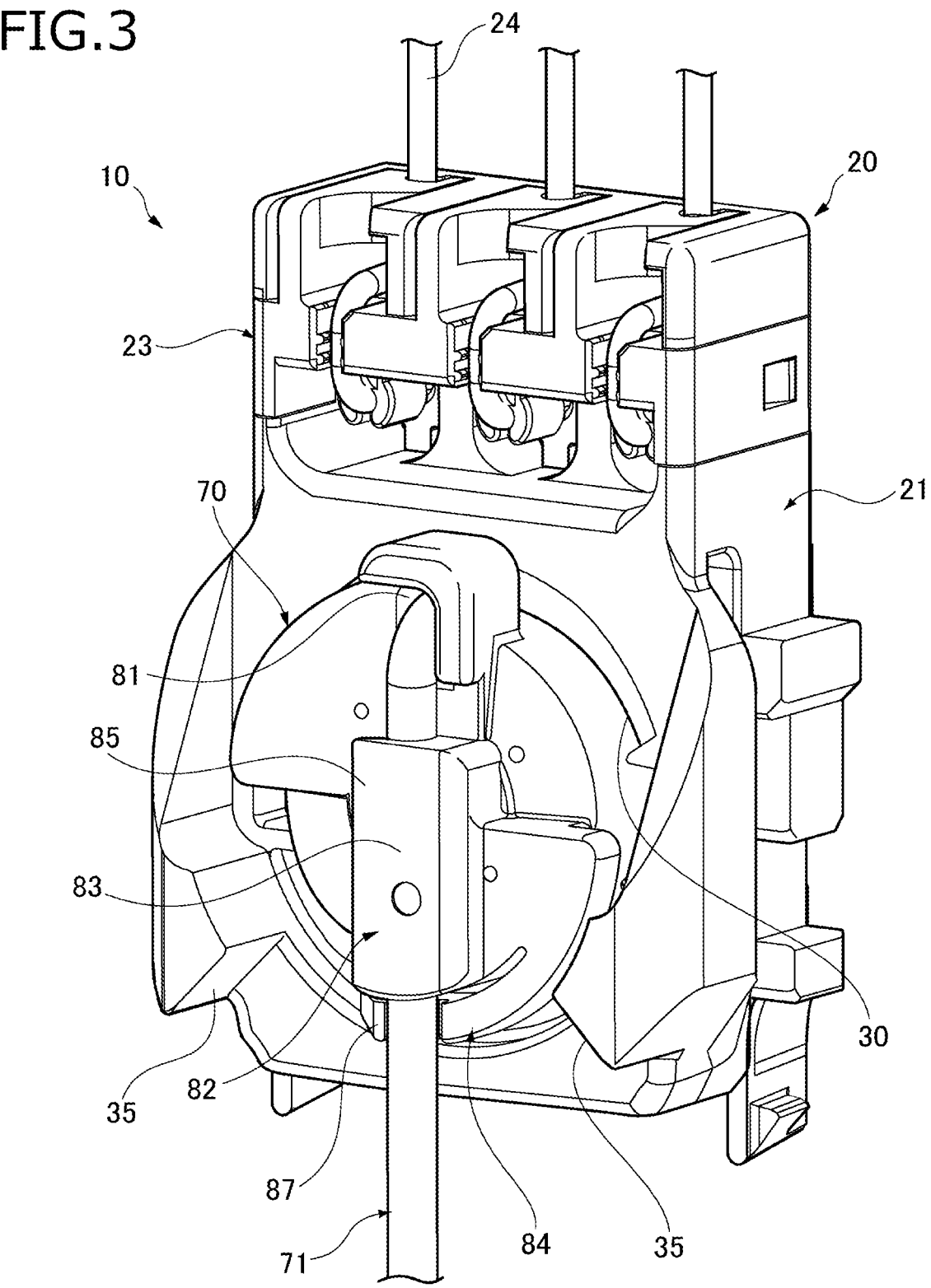
FIG. 3 is a perspective view of an essential part of the liquid level detecting device according to the embodiment.
Figure 4:
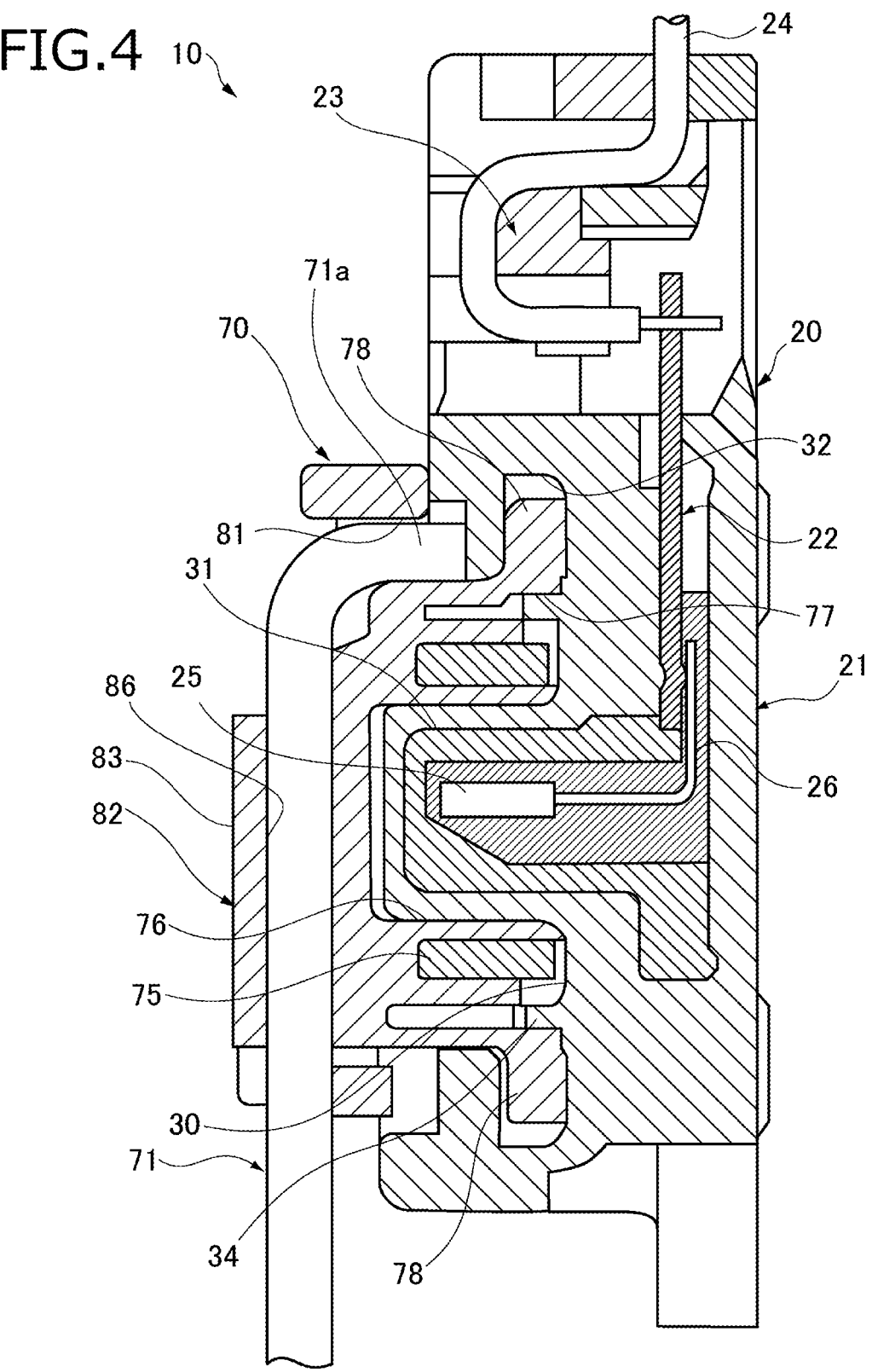
FIG. 4 is a sectional view of the liquid level detecting device according to the embodiment.

An embodiment of the present invention will be hereinafter described with reference to the drawings. FIG. 1 is a perspective view of the whole of a liquid level detecting device 10 according to the embodiment. FIG. 2 is an exploded perspective view of the liquid level detecting device 10. FIG. 3 is a perspective view of an essential part of the liquid level detecting device 10. FIG. 4 is a sectional view of the liquid level detecting device 10.

As shown in FIGS. 1 and 2, the liquid level detecting device 10 according to the embodiment includes a device main body 20, a holder 70, a float arm 71, and a float 72. The device main body 20 has a sensor housing 21, a terminal 22, and a holding member 23.

As shown in FIGS. 3 and 4, the terminal 22 and the holding member 23 are attached to the sensor housing 21. A lead 26 of a Hall element 25 which is provided inside the sensor housing 21 is electrically connected to the terminal 22. Detection wires 24 which are held by the holding member 23 are connected to the terminal 22 and lead out from the top of the sensor housing 21.

A base portion of the float arm 71 is connected to the holder 70. The float 72 is fixed to the other end portion, which is a free end portion, of the float arm 71. The holder 70 which is circular and has a circular-ring-shaped magnet 75 inside is attached to a front portion of the sensor housing 21 and held by it rotatably. The holder 70 has an axial recess 76 at its center on the rear side. The magnet 75 is disposed outside the axial recess 76. The holder 70 is formed with a guide recess 77 on the rear side outside the magnet 75. The holder 70 also has a pair of brims 78 at top and bottom positions on its circumference on the rear side. The brims 78 project outward in opposite radial directions.

The liquid level detecting device 10 is attached to an attachment target portion of, for example, a fuel tank that is installed in a vehicle such as an automobile, and detects a liquid level of a fuel stored inside the fuel tank.

In the liquid level detecting device 10, the float arm 71 swings as the float 72 moves following the liquid surface. And the holder 70 to which the float arm 71 is connected rotates with respect to the device main body 20. In response, the Hall element 25 which is provided in the device main body 20 detects a variation of the magnetic flux generated by the magnet 75 which is provided in the holder 70 and a detection result is sent to a measuring unit through the detection wires 24. The measuring unit determines a liquid level on the basis of the detection result received from the Hall element 25, and issues a warning if necessary. For example, the measuring unit issues a warning of a fuel shortage of the fuel tank.

Figure 5:
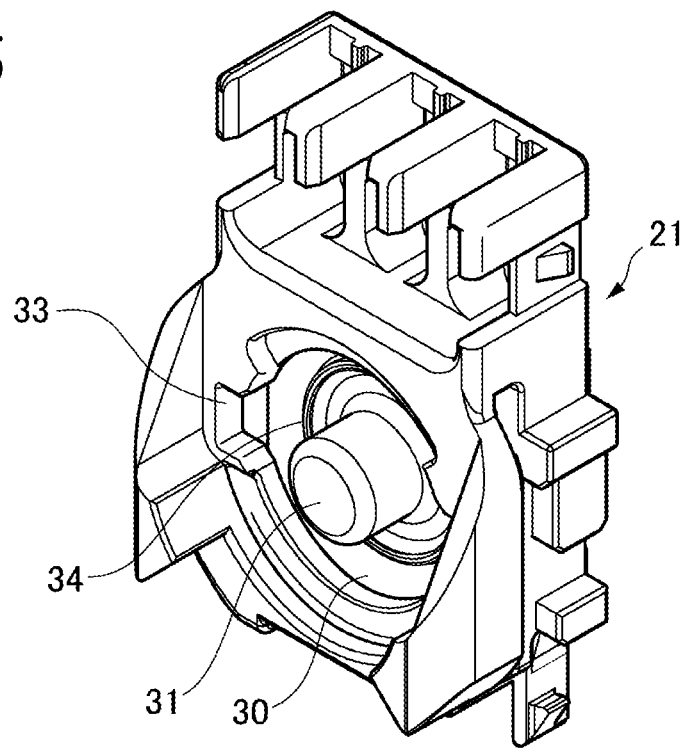
FIG. 5 is a perspective view of a sensor housing.
Figure 6:
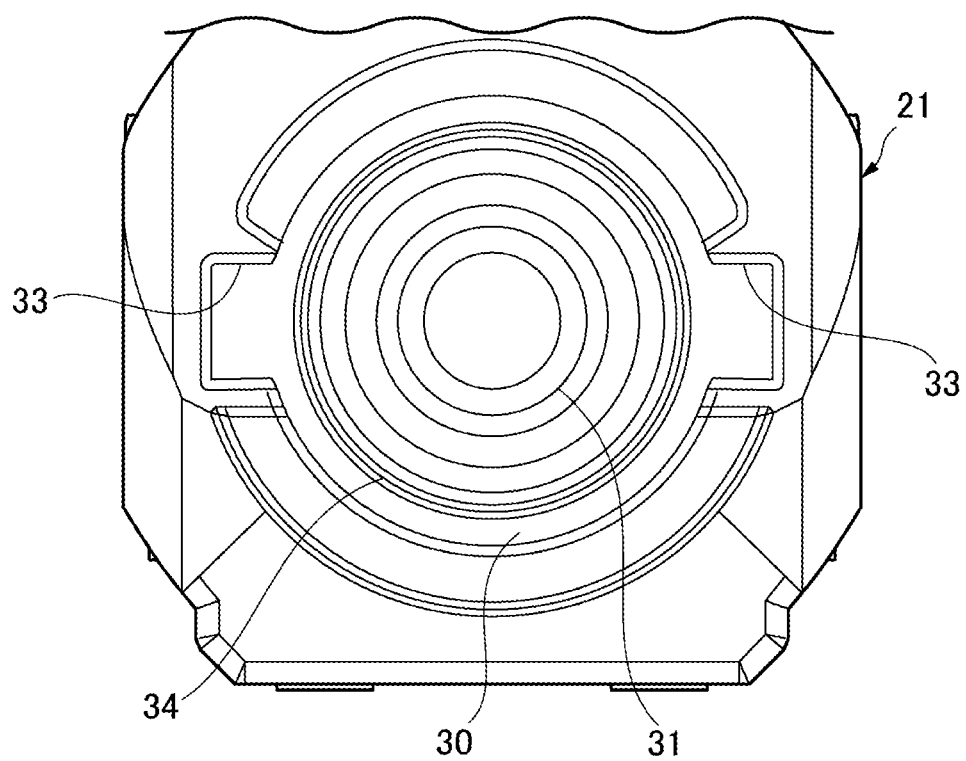
FIG. 6 is a front view of part of the sensor housing.

FIG. 5 is a perspective view of the sensor housing 21. FIG. 6 is a front view of part of the sensor housing 21.

As shown in FIGS. 5 and 6, the sensor housing 21 of the device main body 20 has, on the front side, a rotation recess 30 in which the holder 70 is set rotatably. The rotation recess 30 is circular in a front view. A shaft portion 31 which is provided with the Hall element 25 projects at the center in the rotation recess 30. In the sensor housing 21, a lock groove 32 is formed over the full circumference adjacent to an outside portion of the rotation recess 30 (see FIG. 4). The sensor housing 21 is formed with a pair of insertion holes 33 on the front side at opposite positions (i.e., left and right positions) on the circumference of the rotation recess 30. The insertion holes 33 communicate with the lock groove 32. A guide projection strip 34 is formed over the full circumference at the bottom of the rotation recess 30 so as to surround the shaft portion 31.

Figure 7A:
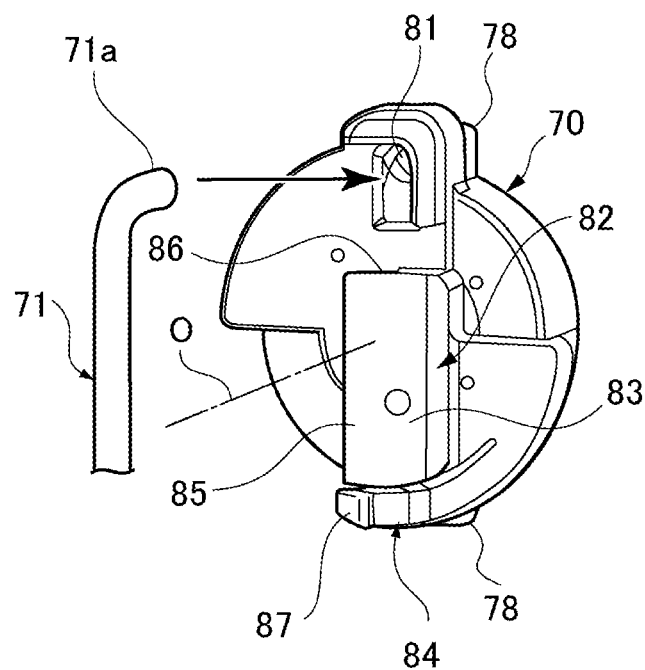
FIGS. 7A and 7B are perspective views, before and during attachment of a float arm, respectively, and illustrate how the float arm is attached to a holder.
Figure 7B:
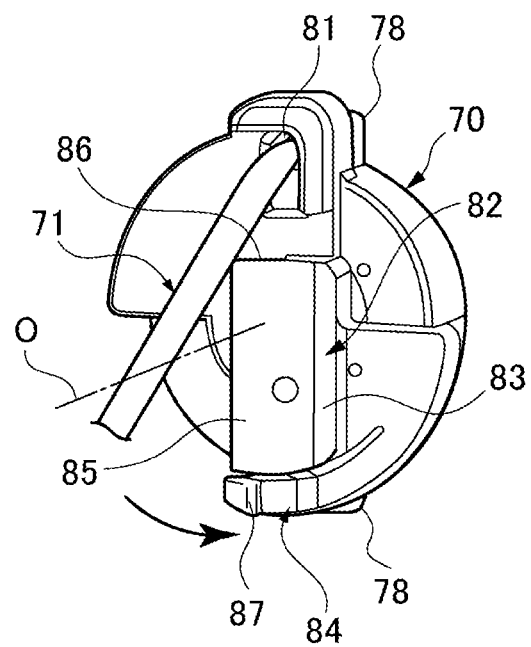
Figure 8A:
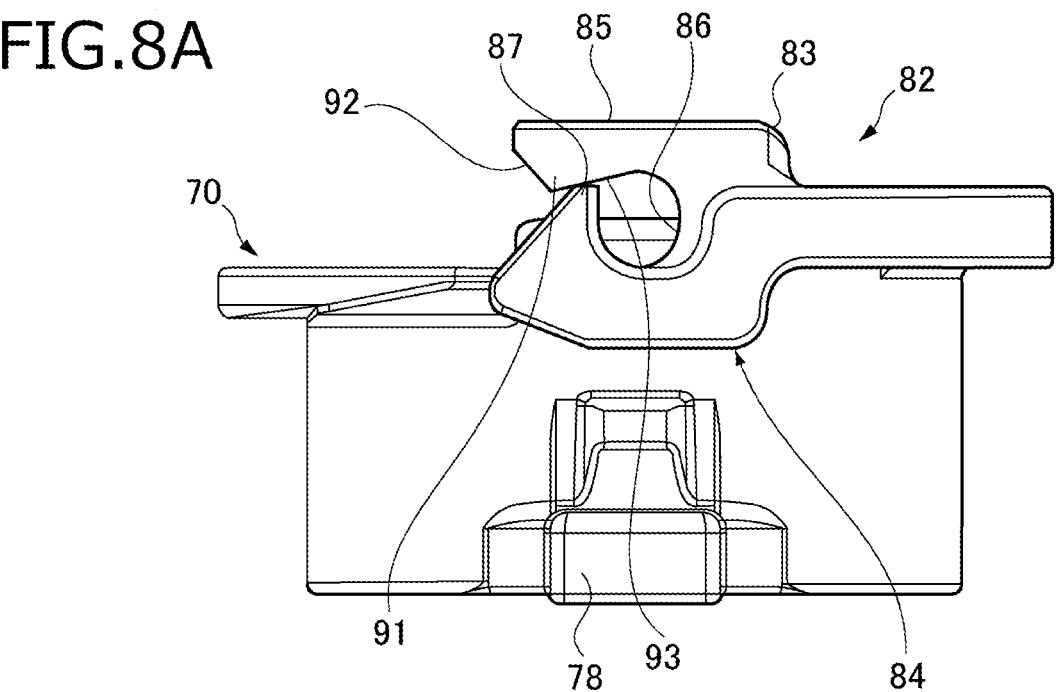
FIGS. 8A and 8B are a bottom view and a side view of the holder, respectively, and illustrate the structure of the holder.
Figure 8B:
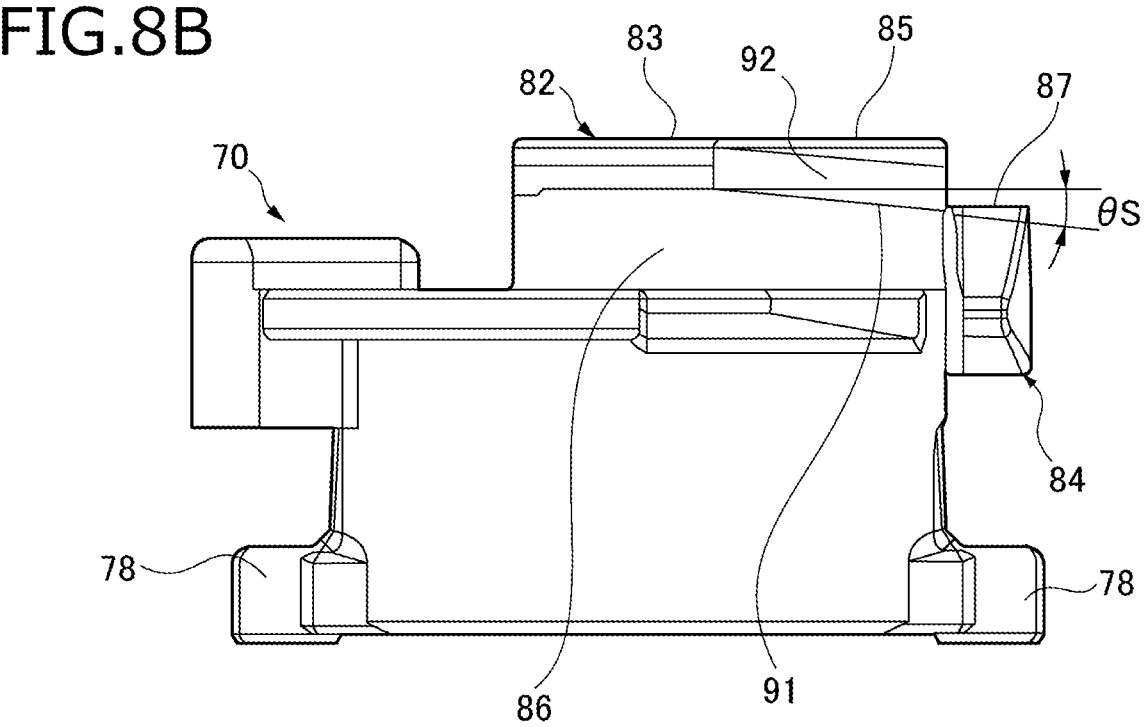
Figure 9A:
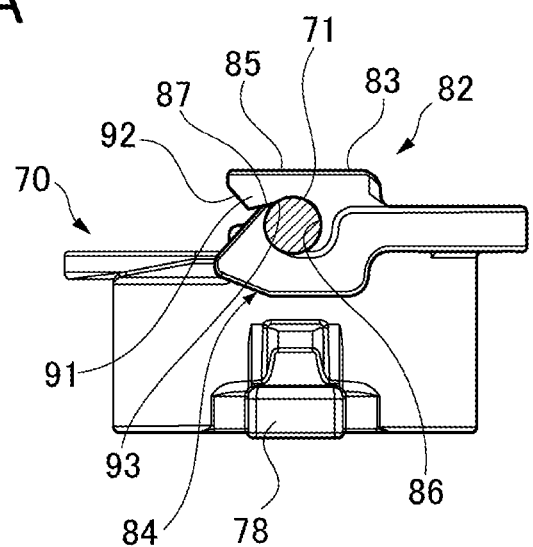
FIGS. 9A and 9B are a bottom view and a side view of the holder, respectively, and show a state that float arm is attached to the holder.
Figure 9B:
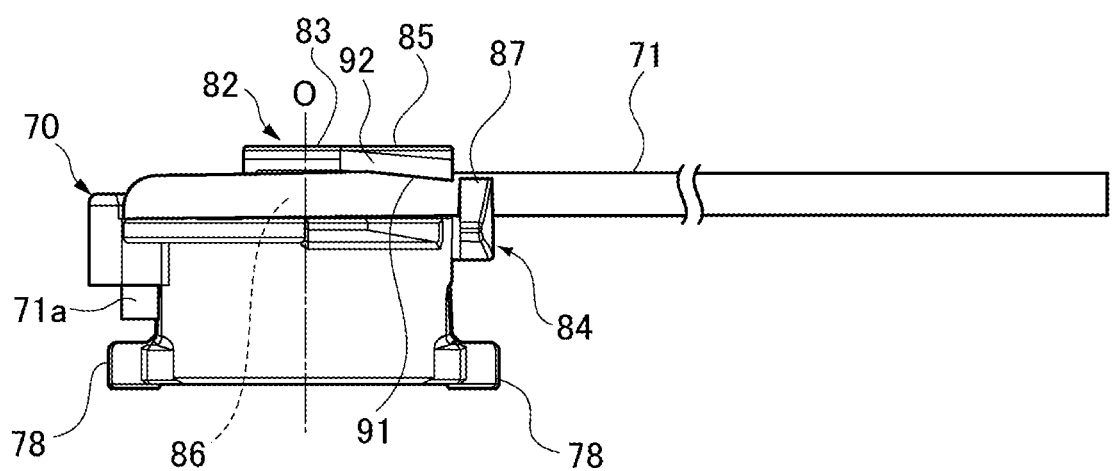

FIGS. 7A and 7B are perspective views, before and during attachment of the float arm 71, respectively, and illustrate how the float arm 71 is attached to the holder 70. FIGS. 8A and 8B are a bottom view and a side view of the holder, respectively, and illustrate the structure of the holder 70. FIGS. 9A and 9B are a bottom view and a side view of the holder 70, respectively, and show a state that float arm 71 is attached to the holder 70.

As shown in FIGS. 7A and 7B, the holder 70 has an arm fixing portion 82. The float arm 71 is fixed to the holder 70 by means of the arm fixing portion 82 so as to extend perpendicularly to and cross the rotation axis O of the holder 70. The arm fixing portion 82 has a lock hole 81, a holding portion 83, and a lock portion 84. The lock hole 81, which is a hole that penetrates through the holder 70 in its thickness direction, is formed in a portion, located on the circumference, of the holder 70. The base portion (one end portion) of the float arm 71 has a lock end portion 71a which is bent at a right angle and inserted in the lock hole 81.

As shown in FIGS. 8A and 8B, the holding portion 83 is formed on the front surface of the holder 70. The holding portion 83 has a holding piece 85 which projects sideways, and a holding groove 86 is formed between the holding piece 85 and a portion of the front surface of the holder 70. A portion, in the vicinity of its base-side end, of the float arm 71 is fitted into the holding groove 86 from the side.

A bottom portion of the left side edge of the holding piece 85 of the holding portion 83 is formed with a holding projection 91 which projects toward the front surface of the holder 70. The holding projection 91 is formed at a position that is closer to the tip of the float arm 71 than the rotation axis O of the holder 70 is. The projection length of the holding projection 91 increases gradually as the position goes away from the lock hole 81. As a result, in a side view, the tip edge of the holding projection 91 of the holding piece 85 is inclined so as to form an inclination angle θs with the inner surface of the holding piece 85.

The holding projection 91 has a guide surface 92 and a holding surface 93 on the opening side and the deep side of the holding groove 86, respectively. The guide surface 92 is a slant surface that is inclined so as to come closer to the front surface of the holder 70 gradually as the position goes in the direction in which the float arm 71 is inserted into the holding groove 86. The holding surface 93 is a slant surface that is inclined so as to come closer to the front surface of the holder 70 gradually as the position goes in the direction opposite to the insertion direction of the float arm 71, that is, toward the opening of the holding groove 86.

The lock portion 84 is formed in the holding portion 83 on the side opposite to the lock hole 81, and has a claw 87 which projects toward the front side of the holder 70. The claw 87 on which a circumferential surface of the float arm 71 that is fitted in the holding groove 86 of the holding portion 83 is locked. The lock portion 84 extends from the front edge of the holder alongside its bottom portion. As such, having a flexible cantilever arm structure (see FIGS. 7A and 7B), the lock portion 84 can easily be deformed elastically and the claw 87 can thus be displaced easily.

To attach the holder 70 to the sensor housing 21, the brims 78 of the holder 70 are set opposed to the respective insertion holes 33 of the sensor housing 21 and then the holder 70 is fitted into the rotation recess 30. As a result, the brims 78 are inserted through the respective insertion holes 33 and the shaft portion 31 of the sensor housing 21 is inserted into the axial recess 76 of the holder 70. And the guide projection strip 34 of the sensor housing 21 goes into the guide recess 77 of the holder 70.

Subsequently, the holder 70 that is fitted in the rotation recess 30 is rotated so that the lock hole 81 will be located at the top. As a result, the brims 78 of the holder 70 go into the lock groove 32 of the sensor housing 21, whereby the holder 70 is prevented from coming off the rotation recess 30 of the sensor housing 21.

To attach the float arm 71 to the holder 70, first, the lock end portion 71a which is part of the base portion of the float arm 71 is inserted into the lock hole 81 of the holder (see FIG. 7A).

Subsequently, the float arm 71 is rotated with the lock end portion 71a (inserted in the lock hole 81) as a supporting point and a portion, in the vicinity of its base-side end, of the float arm 71 is fitted into the holding groove 86 of the holding portion 83 from the side (see FIG. 7B). As a result, as shown in FIGS. 9A and 9B, the portion, in the vicinity of its base-side end, of the float arm 71 is held by the holding portion 83 and a circumferential surface of the float arm 71 is locked on the claw 87 of the lock portion 84. In this manner, the base portion is fixed to the holder 70.

The holding projection 91 is formed in the holding piece 85 of the holding portion 83 in such a manner that its projection length increases gradually as the position goes away from the lock hole 81. Thus, when the float arm 71 is fitted into the holding groove 86, the holding piece 85 is lifted up gradually starting from the side of the lock hole 81 by the float arm 71 that is being rotated with its lock end portion 71a as the supporting point. Furthermore, the holding projection 91 has the guide surface 92 which is inclined so as to come closer to the front surface of the holder 70 gradually as the position goes in the direction in which the float arm 71 is inserted into the holding groove 86. Thus, when the float arm 71 is inserted into the holding groove 86, the float arm 71 comes into contact with the guide surface 92, whereby the holding piece 85 is lifted up smoothly. With these features, the float arm 71 can be fitted into the holding groove 86 of the holding portion 83 easily with a weak force by rotating the float arm 71 with its lock end portion 71a as the supporting point.

The lock portion 84 extends from the front edge of the holder alongside its bottom portion. As such, having a flexible cantilever arm structure, the lock portion 84 can be deformed elastically and the claw 87 can thus be displaced easily. Thus, when the float arm 71 is fitted into the holding groove 86, the lock portion 84 having the flexible cantilever arm structure is easily deformed elastically. And a circumferential surface of the float arm 71 thus-fitted in the holding groove 86 is locked on the claw 87.

Figure 10:
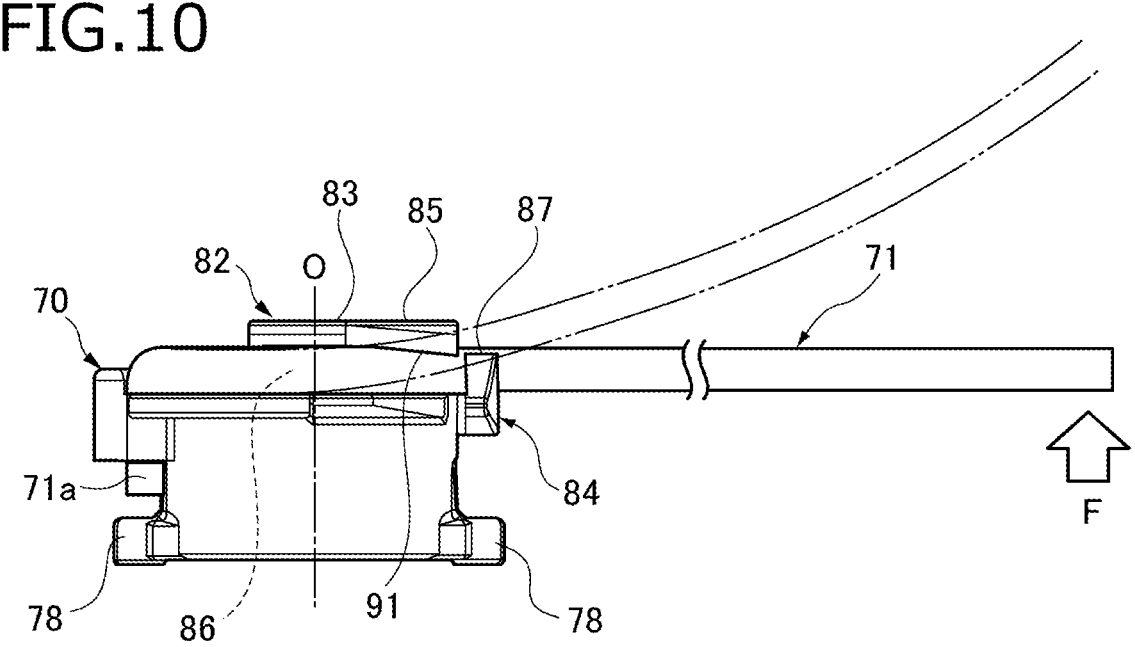
FIG. 10 is a side view of the holder and illustrates how a load acts on the float arm in a direction that crosses its swing direction.
Figure 11A:
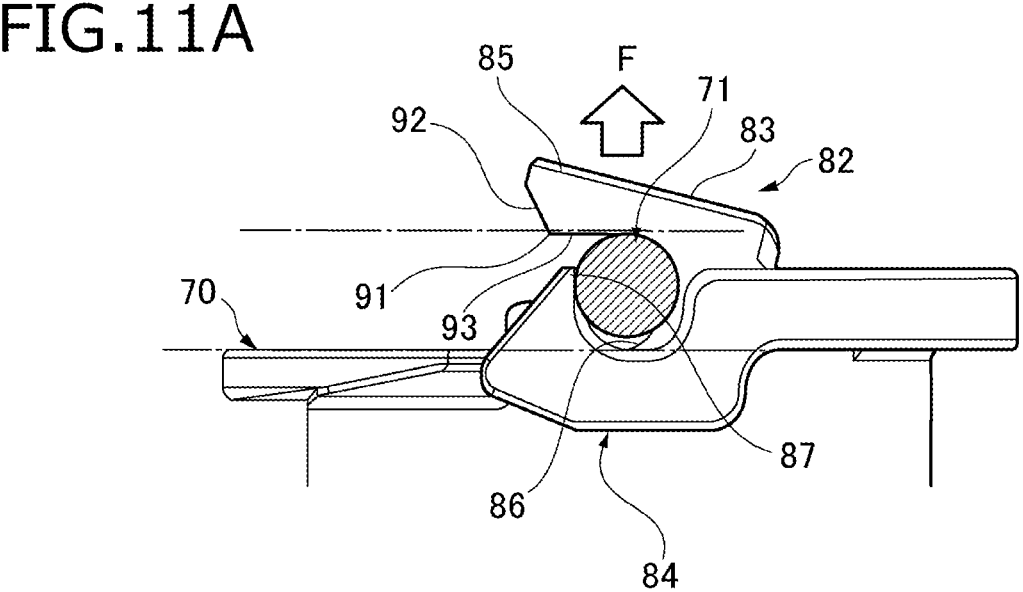
FIGS. 11A and 11B show states that a load is acting on the float arm in a direction that crosses its swing direction.
Figure 11B:
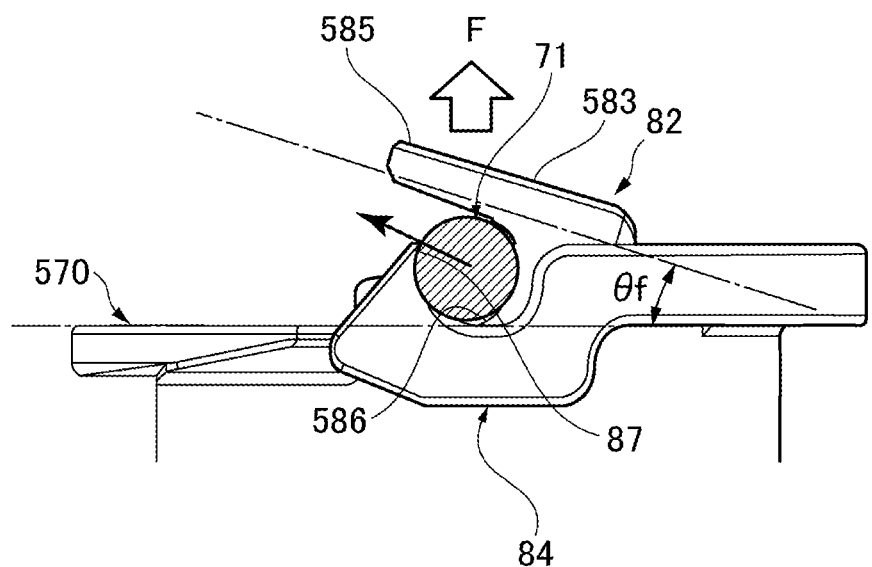

FIG. 10 is a side view of the holder 70 and illustrates how a load acts on the float arm 71 in a direction that crosses its swing direction. FIGS. 11A and 11B show states that a load is acting on the float arm 71 in a direction that crosses its swing direction; FIG. 11A is a bottom view of part of the holder 70 employed in the embodiment which is provided with the holding portion 83 having the holding projection 91, and FIG. 11B is a bottom view of part of a holder 570 of a referential example which is provided with a holding portion 583 not having a holding projection.

As shown in FIG. 10, at the time of, for example, assembling, there may occur an event that the float arm 71 that is held by the holder 70 in the above-described manner comes into contact with a nearby member, as a result of which a load F acts on the float arm 71 in a direction that crosses its swing direction. In that event, the displacement of the float arm 71 increases gradually as the position goes toward its tip (indicated by imaginary lines in FIG. 10).

In the liquid level detecting device 10 according to the embodiment, the bottom portion of the left edge of the holding piece 85 of the holding portion 83 is formed with the holding projection 91 whose projection length increases gradually as the position goes away from the lock hole 81, at the position that is closer to the tip of the float arm 71 than the rotation axis O of the holder 70 is. Thus, even if a load F acts on the float arm 71 in a direction that crosses its swing direction and the holding piece 85 is thereby lifted up, the float arm 71 can be prevented from coming off the holding groove 86 of the holding portion 83.

Furthermore, in the embodiment, the holding projection 91 of the holding piece 85 has the holding surface 93 which is a slant surface that is inclined so as to come closer to the front surface of the holder 70 gradually as the position goes toward the opening of the holding groove 86. Thus, even if a load F acts on the float arm 71 in a direction that crosses its swing direction and the holding piece 85 is thereby lifted up, as shown in FIG. 11A the holding surface 93 is not prone to form such an angle with the front surface of the holder 70 as to allow the float arm 71 to come off through a gap between them. This is an additional measure for preventing the float arm 71 being locked on the claw 87 of the lock portion 84 from coming off the holding groove 86.

In contrast, in the referential example shown in FIG. 11B, since a holding piece 585 is not provided with a holding projection having a holding surface, the inner surface of the holding piece 585 and the front surface of the holder 570 form an angle θf that produces a gap through which the float arm 71 can come off a holding groove 586. Thus, the float arm 71 may move across the inner surface of the holding piece 585 and come off the holding groove 586 of the holding portion 583.

As described above, in the liquid level detecting device 10 according to the embodiment, by fitting the float arm 71 into the holding groove 86 of the holding portion 83 by rotating the float arm 71 with the lock end portion 71a (inserted in the lock hole 81) as a supporting point, the float arm 71 can be fixed being locked on the holding projection 91 of the holding piece 85 of the holding portion 83 and the claw 87 of the lock portion 84.

The projection length of the holding projection 91 of the holding piece 85 of the holding portion 83 increases gradually as the position goes away from the lock hole 81. That is, the projection length of the holding projection 91 increases gradually in the direction in which the displacement of the float arm 71 increases when it receives a load F in a direction that crosses its swing direction. This prevents the float arm 71 from coming off the holding groove 86 when receiving a load F in a direction that crosses its swing direction.

Since the projection length of the holding projection 91 increases gradually as the position goes away from the lock hole 81, it is possible to fit the float arm 71 into the holding groove 86 from the side of the lock hole 81 without the need for doing so forcibly. That is, it is possible to have the float arm 71 held by the holding portion 83 easily with a weak force by rotating the float arm 71 with the lock end portion 71a (inserted in the lock hole 81) as a supporting point.

The holding projection 91 has the holding surface 93 which is inclined so as to come closer to the front surface of the holder 70 as the position goes toward the opening of the holding groove 86. Thus, even if a load F acts on the float arm 71 in a direction that crosses its swing direction and the holding piece 85 is thereby deformed, the holding surface 93 is not prone to form such an angle with the front surface of the holder 70 as to allow the float arm 71 to come off through a gap between them. This is an additional measure for preventing the float arm 71 from coming off the holding groove 86.

Furthermore, the lock portion 84 extends from the holder 70 so as to assume a flexible cantilever arm structure. Thus, the lock portion 84 is bent easily when pushed by the float arm 71 that is being fitted into the holding groove 86. Thus, the float arm 71 can be held by the holding portion 83 by fitting it into the holding groove 86 with a weaker force.

The invention is not limited to the above embodiment and various modifications, improvements, etc. can be made as appropriate. The materials, shapes, sets of dimensions, numbers, locations, etc. of the respective constituent elements of the above embodiment are not limited to those disclosed but can be determined in desired manners as long as the invention can be implemented.

Features of the above-described liquid level detecting device 10 according to the embodiment of the invention will be summarized concisely below in the forms of items [1] to [3]:

[1] A liquid level detecting device (10) including:

a sensor housing (21);

a holder (70) which is held rotatably by the sensor housing (21);

an arm fixing portion (82) provided in the holder (70);

a float arm (71) which has a base portion fixed to the holder (70) by the arm fixing portion (82);

a float (72) which is attached to a tip portion of the float arm (71) and varies in position following a surface level of liquid stored in a tank;

a magnet (75) provided in the holder (70); and a Hall element (25) provided in the sensor housing (21) and detects a displacement of the magnet (75) of the holder (70), wherein the arm fixing portion (82) includes:

a lock hole (81) configured to receive a lock end portion (71a) of the float arm (71), the lock end portion (71a) having a bending shape;

a holding portion (83) having a holding groove (86) configured to receive the float arm (71); and a retaining portion having a claw (84) configured to lock on a circumferential surface of the float arm (71) that is fitted in the holding groove (86);

wherein the holding portion (83) has a holding piece (85) that extends parallel with a front surface of the holder (70) and thereby forms the holding groove (86); and wherein the holding piece (85) has a holding projection (91) that projects toward the front surface of the holder (70) so that a projection length of the holding projection (85) increases gradually as the holding piece goes away from the lock hole (81).

[2] The liquid level detecting device according to item [1], wherein the holding projection (91) has a holding surface (93) that is inclined so as to come closer to the front surface of the holder (70) as the holding projection (91) goes toward an opening of the holding groove (86).

[3] The liquid level detecting device according to item [2], wherein the holding surface (93) is inclined so that a projection length of the holding surface (93) in a direction of a rotation axis (O) of the holder (70) increases as the holding surface goes toward the opening of the holding groove (86).

[4] The liquid level detecting device according to item [3], wherein the holding projection (91) has a guide surface (92) which is adjacent to the holding surface (93) and which is arranged closer to the opening of the holding groove (86) than the holding surface (93); and wherein the guide surface (92) is inclined so that a projection length of the guide surface (92) in the direction of the rotation axis of the holder (70) decreases as the guide surface (92) goes toward the opening of the holding groove (93).

[5] The liquid level detecting device according to any one of items [1] to [4], wherein the lock portion (84) extends from the holder (70) so as to have a flexible cantilever arm structure.

What is claimed is:

1. A device comprising:
  a sensor housing;
  a holder which is held rotatably by the sensor housing;
  an arm fixing portion provided in the holder;
  a float arm which has a base portion fixed to the holder by the arm fixing portion;
  a float which is attached to a tip portion of the float arm and varies in position following a surface level of liquid stored in a tank;
  a magnet provided in the holder; and
  a Hall element which is provided in the sensor housing and detects a displacement of the magnet of the holder,
  wherein the arm fixing portion comprises:
    a lock hole configured to receive a lock end portion of the float arm, the lock end portion having a bending shape;
    a holding portion having a holding groove configured to receive the float arm; and
    a retaining portion having a claw configured to lock on a circumferential surface of the float arm that is fitted in the holding groove;
  wherein the holding portion has a holding piece that extends parallel with a front surface of the holder and thereby forms the holding groove; and
  wherein the holding piece has a holding projection that projects toward the front surface of the holder so that a projection length of the holding projection increases gradually as the holding piece goes away, along a longitudinal direction of the holding groove, from the lock hole.

2. The device according to claim 1, wherein the holding projection has a holding surface that is inclined so as to come closer to the front surface of the holder as the holding projection goes toward an opening of the holding groove.

3. The device according to claim 2, wherein the holding surface is inclined so that a projection length of the holding surface in a direction of a rotation axis of the holder increases as the holding surface goes toward the opening of the holding groove.

4. The device according to claim 3, wherein the holding projection has a guide surface which is adjacent to the holding surface and which is arranged closer to the opening of the holding groove than the holding surface; and
  wherein the guide surface is inclined so that a projection length of the guide surface in the direction of the rotation axis of the holder decreases as the guide surface goes toward the opening of the holding groove.

5. The device according to claim 1, wherein the lock portion extends from the holder so as to have a flexible cantilever arm structure.

6. The device according to claim 1, wherein the tank is a fuel tank installed in a vehicle for storing fuel as the liquid, and the device is used for detecting a surface level of the fuel in the fuel tank.

7. The device according to claim 1,
  wherein, in the longitudinal direction, a length of the holding piece is greater than a length of the claw.

* * * * *